United States Patent [19]

Benjamin

[11] 4,120,601

[45] Oct. 17, 1978

[54] SPADE DRILL

[75] Inventor: Milton L. Benjamin, Chagrin Falls, Ohio

[73] Assignee: Erickson Tool Company, Solon, Ohio

[21] Appl. No.: 839,923

[22] Filed: Oct. 6, 1977

[51] Int. Cl.² .................. B23B 31/44; B23B 51/00
[52] U.S. Cl. .................................. 408/226; 408/228; 408/223
[58] Field of Search ............... 408/226, 227, 228, 229, 408/230, 231, 232, 233

[56] References Cited

U.S. PATENT DOCUMENTS

| 3,776,656 | 12/1973 | Benjamin | 408/233 |
| 3,966,350 | 6/1976 | Benjamin | 408/233 |
| 4,040,764 | 8/1977 | Baturka | 408/226 |

*Primary Examiner*—Harrison L. Hinson

[57] ABSTRACT

A spade drill characterized in that the slotted blade clamping end of the holder has oppositely beveled end surfaces which are perpendicular to the respective side faces of the blade and which are at an angle less than the angle of the respective cutting edges of the blade to define convergent passages of right angle cross section for funneling or tracking chips to diametrically opposite obtuse angle cross section longitudinal grooves in the holder.

5 Claims, 2 Drawing Figures

SPADE DRILL

BACKGROUND OF THE INVENTION

In one known form of spade drill such as disclosed in the Milton L. Benjamin U.S. Pat. No. 3,966,350 granted June 29, 1976, the beveled and inclined ends at the slotted end of the holder form with the sides and cutting edges of the blade divergent chip passages of obtuse angle cross section which, at the wide ends, open into diametrically opposed obtuse angle longitudinal grooves in the holder. Although the spade drill of said patent has numerous advantages over other known spade drills, the obtuse angle divergent chip passages have a tendency of causing radial outflow of chips into the spaces between the exterior of the holder and the wall of the hole being drilled.

SUMMARY OF THE INVENTION

In contradistinction to the foregoing, the present spade drill enables accurate drilling of holes at minimum torque by reason of the provision of convergent chip passages of right angle cross section which track or funnel the chips toward the obtuse angle longitudinal grooves of the holder without causing packing of the chips in the spaces between the exterior of the holder and the wall of the hole being drilled.

DETAILED DESCRIPTION OF A PREFERRED EMBODIMENT

Figure 1:
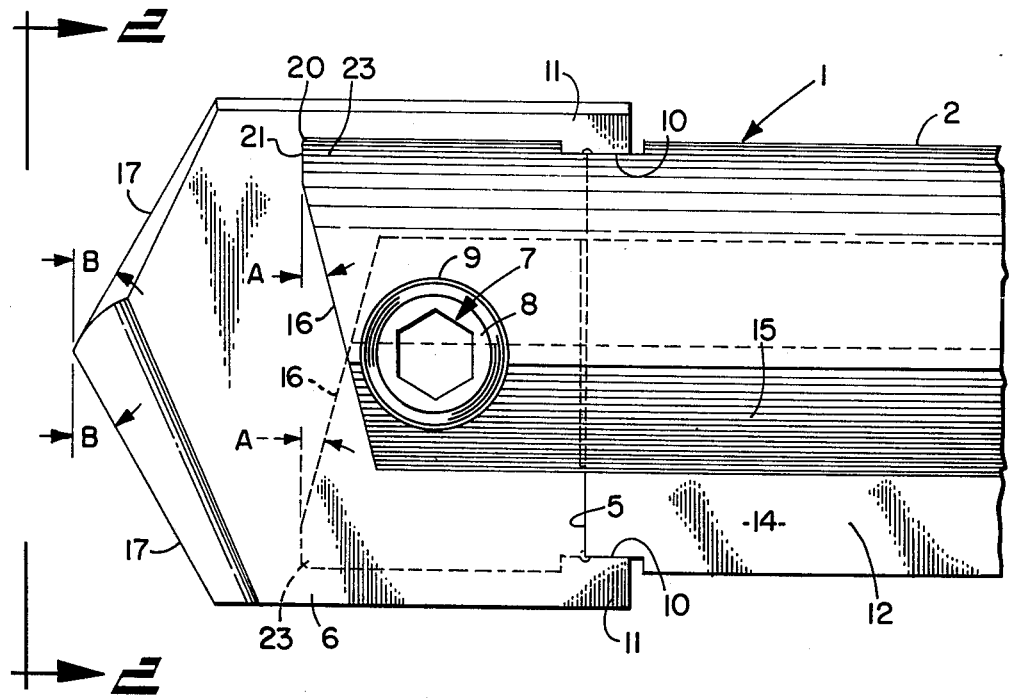
FIG. 1 is a side elevation view of a spade drill embodying the present invention.

The spade drill 1 herein comprises a cylindrical holder 2 having a slot 3 diametrically thereacross providing parallel clamping faces 4 and a bottom face 5 which is perpendicular to the axis of the holder 2, the width of the slot 3 between the faces 4 being substantially equal to the thickness of the spade drill blade 6 which is adapted to be clamped between the faces 4 by means of the socket head cap screw 7. As evident, when the screw 7 is tightened, its head 8 bears on the bottom of the counterbore 9 and draws the faces 4 into tight frictional engagement with opposite sides of the blade 6. The shank of the screw 7 extends through a hole in the blade 6 as is well known in the art, and the distance across the parallel flats 10 of the holder 2 is substantially equal to the distance between the blade extensions 11 so that the blade will be accurately located in centered position with its longitudinal axis aligned with the axis of the holder 2. Each side of the holder 2 has an angular longitudinally extending groove 12 which in cross section is of obtuse angle (preferably 120°) with one side 14 being substantially flush with the corresponding side face of the blade 6 and with the other side 15 extending beyond the bottom 5 of the slot 3.

The holder 2 on opposite sides of the slot 3 has oppositely beveled end surfaces 16 which intersect the respective inclined sides 15 of the grooves 12 and which are perpendicular to the respective side faces of the blade 6. In the case of a spade drill blade 6 having a pointed cutting end with cutting edges 17 of 120° included angle as shown, the angle A of each beveled end surface 16 will preferably be 20° for spade drills up to about 2 inch diameter and 15° for larger spade drills. By reason of the angle A of the beveled end surfaces 16 being less than the angle B of the cutting edges 17, convergent passages of right angle cross section are provided for funneling or tracking the flow of chips when the spade drill 1 is in use. Because the surfaces 16 are at right angles to the respective side faces of the blade 6, radial outflow of chips is prevented and thus the chips will not be packed into the spaces 18 between the exterior of the holder 2 and the wall of the hole 19 being drilled. The beveled end surfaces 16 extend nearly to the axially forward relatively sharp corners 20 of the blade clamping faces 4 to leave small area flats 21 to minimize packing of chips between the bottom of the hole 19 and the end of the holder 2.

Figure 2:
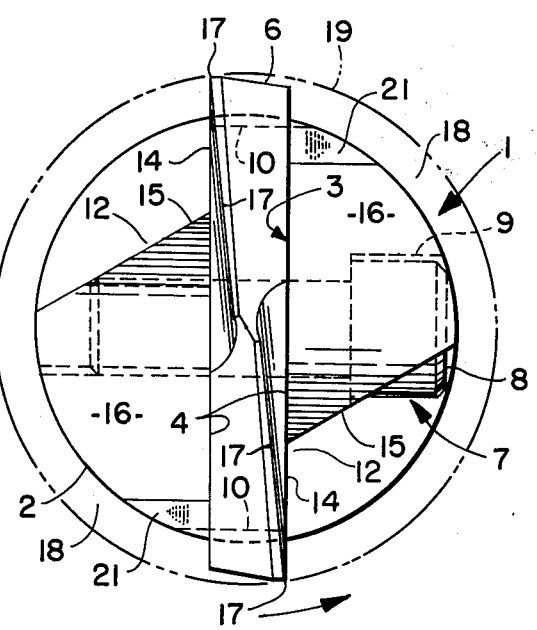
FIG. 2 is an elevation view taken substantially along the line 2—2 of FIG. 1.

When the spade drill 1 is rotated in the direction indicated by the arrow in FIG. 2, the torque load on each cutting edge 17 is supported in the zone 23 of the side 4 of the slot which is near the cutting end and near the cutting radius but on the side of the blade 6 which is opposite to the cutting edge 17. The sides 4 of the slot 3 which engage the sides on which the cutting edges 17 are located are beveled as at 16 to form convergent chip flow passages of right angle cross section for tracking or funneling the flow of chips toward the respective longitudinal grooves 12 without radial outflow into the spaces 18 between the holder 2 and the wall of the hole 19 being drilled.

I, therefore, particularly point out and distinctly claim as my invention:

1. In a spade drill wherein a holder has a slot diametrically across one end thereof, and a blade having cutting edges forming an obtuse angle cutting point is clamped in said slot by screw means with its cutting edges disposed axially forwardly of the open end of said slot and with its other end in abutting engagement with the bottom of said slot, the improvement which comprises oppositely beveled end surfaces on said holder which are perpendicular to the opposite side faces of the blade and which respectively extend angularly from near the axially forward corner of the slot at an angle less than the angle of the respective cutting edges to define convergent passages of right angle cross section for tracking the flow of chips toward diametrically opposite obtuse angle longitudinal grooves in said holder.

2. The spade drill of claim 1, wherein said grooves have one side substantially flush with the respective side faces of said blade and the other side intersecting said beveled end surfaces.

3. The spade drill of claim 1, wherein said beveled end surfaces are at an angle about 10° to 15° less than the angle of the respective cutting edges.

4. The spade drill of claim 1, wherein the angle difference between said beveled end surfaces and the respective cutting edges is about 10° for blades having a cutting diameter up to about 2 inch.

5. The spade drill of claim 1, wherein the angle difference between said beveled end surfaces and the respective cutting edges is about 15° for blades having cutting diameters greater than about 2 inch.

* * * * *